(12) United States Patent
Lee et al.

(10) Patent No.: US 9,680,623 B2
(45) Date of Patent: Jun. 13, 2017

(54) METHOD FOR REPORTING CHANNEL STATE, AND APPARATUS THEREFOR

(71) Applicant: LG Electronics Inc., Seoul (KR)

(72) Inventors: Jihyun Lee, Anyang-si (KR); Hanbyul Seo, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 95 days.

(21) Appl. No.: 14/391,120

(22) PCT Filed: Apr. 22, 2013

(86) PCT No.: PCT/KR2013/003386
§ 371 (c)(1),
(2) Date: Oct. 7, 2014

(87) PCT Pub. No.: WO2013/157899
PCT Pub. Date: Oct. 24, 2013

(65) Prior Publication Data
US 2015/0078284 A1     Mar. 19, 2015

Related U.S. Application Data

(60) Provisional application No. 61/635,872, filed on Apr. 20, 2012, provisional application No. 61/649,352, (Continued)

(51) Int. Cl.
*H04W 24/10* (2009.01)
*H04W 72/04* (2009.01)
(Continued)

(52) U.S. Cl.
CPC .......... *H04L 5/0057* (2013.01); *H04L 1/0026* (2013.01); *H04W 72/042* (2013.01); *H04L 5/0035* (2013.01); *H04W 72/02* (2013.01)

(58) Field of Classification Search
None
See application file for complete search history.

(56) References Cited

U.S. PATENT DOCUMENTS

2007/0026813 A1* 2/2007 Khan .................... H04L 1/0026
455/69
2008/0227398 A1* 9/2008 Haghighat ............ H04L 1/0029
455/63.1
(Continued)

FOREIGN PATENT DOCUMENTS

| WO | 2010-087646 A2 | 8/2010 |
| WO | 2010-151050 A2 | 12/2010 |
| WO | 2011-074923 A2 | 6/2011 |

OTHER PUBLICATIONS

Samsung, "Discussion on ePDCCH Design Issues", R1-112517, 3GPP TSG-RAN #66, Athens, Greece, Aug. 22-26, 2011.

*Primary Examiner* — Michael J Moore, Jr.
*Assistant Examiner* — Duc Duong
(74) *Attorney, Agent, or Firm* — Dentons US LLP

(57) ABSTRACT

According to one embodiment of the present invention, a method for reporting the channel state of an enhanced physical downlink control channel (EPDCCH) in a wireless communication system is disclosed, comprising the steps of: selecting N sub-bands from a set of sub-bands; and reporting a channel quality indicator (CQI) for the N sub-bands. At least one sub-band from among the N sub-bands (hereinafter, referred to as an EPDCCH SB) may be a sub-band including a pair of physical resource blocks (PRB) set as the EPDCCH.

6 Claims, 17 Drawing Sheets

Related U.S. Application Data filed on May 20, 2012, provisional application No. 61/712,819, filed on Oct. 12, 2012.

(51) Int. Cl.
*H04L 5/00* (2006.01)
*H04L 1/00* (2006.01)
*H04W 72/02* (2009.01)

(56) References Cited

U.S. PATENT DOCUMENTS

| | | | | |
|---|---|---|---|---|
| 2009/0154588 A1* | 6/2009 | Chen | | H04L 1/0026 375/267 |
| 2009/0163142 A1* | 6/2009 | Pi | | H04L 1/0026 455/62 |
| 2009/0274224 A1* | 11/2009 | Harris | | H04L 1/003 375/260 |
| 2010/0002664 A1* | 1/2010 | Pan | | F03B 13/00 370/338 |
| 2011/0044250 A1 | 2/2011 | Han et al. | | |
| 2011/0243017 A1* | 10/2011 | Prasad | | H04W 72/085 370/252 |
| 2012/0176925 A1* | 7/2012 | Hwang | | H04W 24/10 370/252 |
| 2013/0058285 A1* | 3/2013 | Koivisto | | H04L 1/0046 370/329 |
| 2013/0064128 A1* | 3/2013 | Li | | H04B 7/065 370/252 |
| 2013/0094464 A1* | 4/2013 | Li | | H04B 7/066 370/329 |
| 2013/0242890 A1* | 9/2013 | He | | H04L 5/1469 370/329 |
| 2013/0242947 A1* | 9/2013 | Chen | | H04W 72/04 370/329 |
| 2014/0362802 A1* | 12/2014 | Jitsukawa | | H04B 7/0632 370/329 |
| 2015/0003268 A1* | 1/2015 | Wang | | H04W 72/08 370/252 |
| 2015/0181567 A1* | 6/2015 | Skov | | H04W 24/10 370/329 |

* cited by examiner

FIG. 15

| SB 4 | SB 4 | SB 4 | SB 4 |
| SB 2 | SB 2 | SB 2 | SB 2 |
| SB 5 | SB 5 | SB 5 | SB 5 |
| SB 1 | SB 1 | SB 1 | SB 1 |
| E-SB 2 | SB 3 | SB 3 | SB 3 |
| SB 3 | SB 6 | SB 6 | SB 6 |
| E-SB 1 | E-SB 2 | E-SB 2 | E-SB 2 |
| E-SB 3 | E-SB 1 | E-SB 1 | E-SB 1 |
| SB 6 | E-SB 3 | E-SB 3 | E-SB 3 |

(a) SBs are sorted in descending order of CQI  (b)  (c)  (d)

METHOD FOR REPORTING CHANNEL STATE, AND APPARATUS THEREFOR

This Application is a 35 U.S.C. §371 National Stage entry of International Application No. PCT/KR2013/003386, filed Apr. 22, 2013, which claims benefit of Provisional Application Nos. 61/635,872 filed Apr. 20, 2012; 61/649,352 filed May 20, 2012; and 61/712,819 filed Oct. 12, 2012, all of which are incorporated by reference in their entirety herein.

TECHNICAL FIELD

The present invention relates to a wireless communication system and, more particularly, to a method for reporting channel state and an apparatus therefor.

BACKGROUND ART

Owing to introduction of a multi-node system, various communication techniques have become available, thereby improving channel quality. However, a new control channel is required to apply Multiple-Input Multiple-Output (MIMO) and Coordinated Multi-Point (CoMP) to the multi-node environment. In this context, Enhanced-Physical Downlink Control Channel (EPDCCH) is under discussion and it is regulated that the EPDCCH is assigned to a data region rather than a legacy control region (hereinafter referred to as a PDCCH region). Consequently, since the EPDCCH enables transmission of control information for a node to each UE, lack of the legacy PDCCH region may be solved. For reference, the EPDCCH is not provided to legacy UEs and only LTE-A UEs can receive the EPDCCH.

In this environment, for EPDCCH link adaptation, channel state of the EPDCCH needs to be reported.

DISCLOSURE

Technical Problem

An object of the present invention devised to solve the problem lies in a method for reporting a channel state of a subband of a downlink control channel.

Another object of the present invention devised to solve the problem lies in a method for selecting a subband of a downlink control channel to report channel state.

It is to be understood that both the foregoing general description and the following detailed description of the present invention are exemplary and explanatory and are intended to provide further explanation of the invention as claimed.

Technical Solution

The object of the present invention can be achieved by providing a method for reporting channel state of an Enhanced Physical Downlink Control Channel (EPDCCH) in a wireless communication system, the method including selecting N subbands in a set of subbands, and reporting Channel Quality Indicator (CQI) of the N subbands, wherein at least one subband among the N subbands is an EPDCCH subband (EPDCCH SB) including a Physical Resource Block (PRB) pair configured as the EPDCCH.

Additionally or alternatively, the N subbands may be selected to include M EPDCCH SBs, where N and M are integers equal to or greater than 1 and N is equal to or greater than M, and the M EPDCCH SBs may be upper M EPDCCH SBs ranked in a descending order of CQI value among EPDCCH SBs included in the set of subbands.

Additionally or alternatively, N and M may be configured through a higher layer signal.

In another aspect of the present invention, provided herein is a user device configured to transmit an uplink signal in a wireless communication system, the user device including a Radio Frequency (RF) unit, and a processor configured to control the RF unit, wherein the processor is configured to select N subbands in a set of subbands and report Channel Quality Indicator (CQI) of the N subbands, and wherein at least one subband among the N subbands is an EPDCCH subband (EPDCCH SB) including a Physical Resource Block (PRB) pair configured as the EPDCCH.

Additionally or alternatively, the processor may be configured to select the N subbands to include M EPDCCH SBs, where N and M are integers equal to or greater than 1 and N is equal to or greater than M, and the M EPDCCH SBs may be upper M EPDCCH SBs ranked in a descending order of CQI value among EPDCCH SBs included in the set of subbands.

Additionally or alternatively, N and M may be configured through a higher layer signal.

In another aspect of the present invention, provided herein is a method for reporting channel state of an Enhanced Physical Downlink Control Channel (EPDCCH) in a wireless communication system, the method including selecting N subbands in a set of subbands, and reporting Channel Quality Indicator (CQI) of the subbands, after a predetermined offset value is added to the CQI value of an EPDCCH subband (EPDCCH SB) including a Physical Resource Block (PRB) pair configured as the EPDCCH.

Additionally or alternatively, when the CQI value is determined as a ratio of a reference signal power to Physical Downlink Shared Channel (PDSCH) power, the N subbands may be selected based on the CQI value calculated after a predetermined offset value is added to the ratio for the EPDCCH SB.

In another aspect of the present invention, provided herein is a user device configured to transmit an uplink signal in a wireless communication system, the user device including a Radio Frequency (RF) unit, and a processor configured to control the RF unit, wherein the processor is configured to select N subbands in a set of subbands and report Channel Quality Indicator (CQI) of the N subbands, and wherein the processor is configured to select the N subbands based on a CQI value of the subbands, after a predetermined offset value is added to the CQI value of an EPDCCH subband (EPDCCH SB) including a Physical Resource Block (PRB) pair configured as the EPDCCH.

Additionally or alternatively, when the CQI value is determined as a ratio of a reference signal power to Physical Downlink Shared Channel (PDSCH) power, the processor may be configured to select the N subbands based on the CQI value calculated after a predetermined offset value is added to the ratio for the EPDCCH SB.

It is to be understood that both the foregoing general description and the following detailed description of the present invention are exemplary and explanatory and are intended to provide further explanation of the invention as claimed.

Advantageous Effects

According to an embodiment(s) of the present invention, channel state of a specific subband may be reported.

In addition, according to an embodiment(s) of the present invention, channel state may be efficiently reported.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 15 illustrates exemplary subband selection according to an embodiment of the present invention;

BEST MODE

Figure 1:
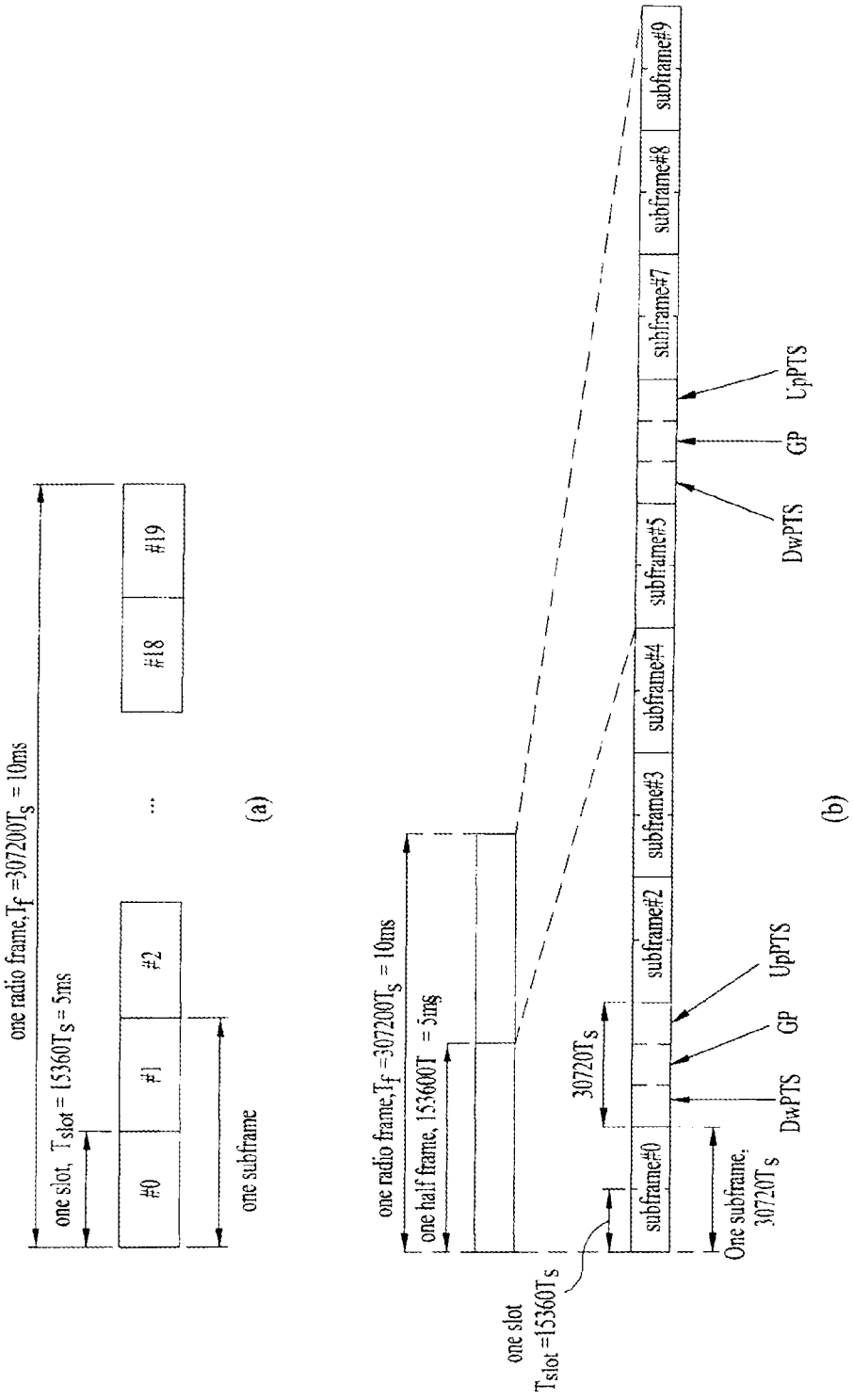
FIG. 1 illustrates an exemplary radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

Also, technique, device, system, which will be described hereinafter, may be applied to various wireless multiplexing access systems. For convenience of description, it is assumed that the present invention is applied to a 3GPP LTE(-A). However, it is to be understood that technical features of the present invention are limited to the 3GPP LTE(-A). For example, although the following description will be made based on a mobile communication system corresponding to a 3GPP LTE(-A) system, the following description may be applied to other random mobile communication system except matters specific to the 3GPP LTE(-A).

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. Also, in the present invention, SRS time-frequency resources (or REs) may mean time-frequency resources (or REs) transmitted from the user equipment to the base station to allow the base station to carry a sounding reference signal (SRS) used for measurement of an uplink channel status formed between the user equipment and the base station. The reference signal (RS) means a signal of a special waveform previously defined and known well by the user equipment and the base station, and may be referred to as a pilot.

In the present invention, a cell refers to a specific geographical area in which one or more nodes provide communication services. Accordingly, communication with a specific cell may mean communication with an eNB or a node providing communication services to the specific cell.

A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
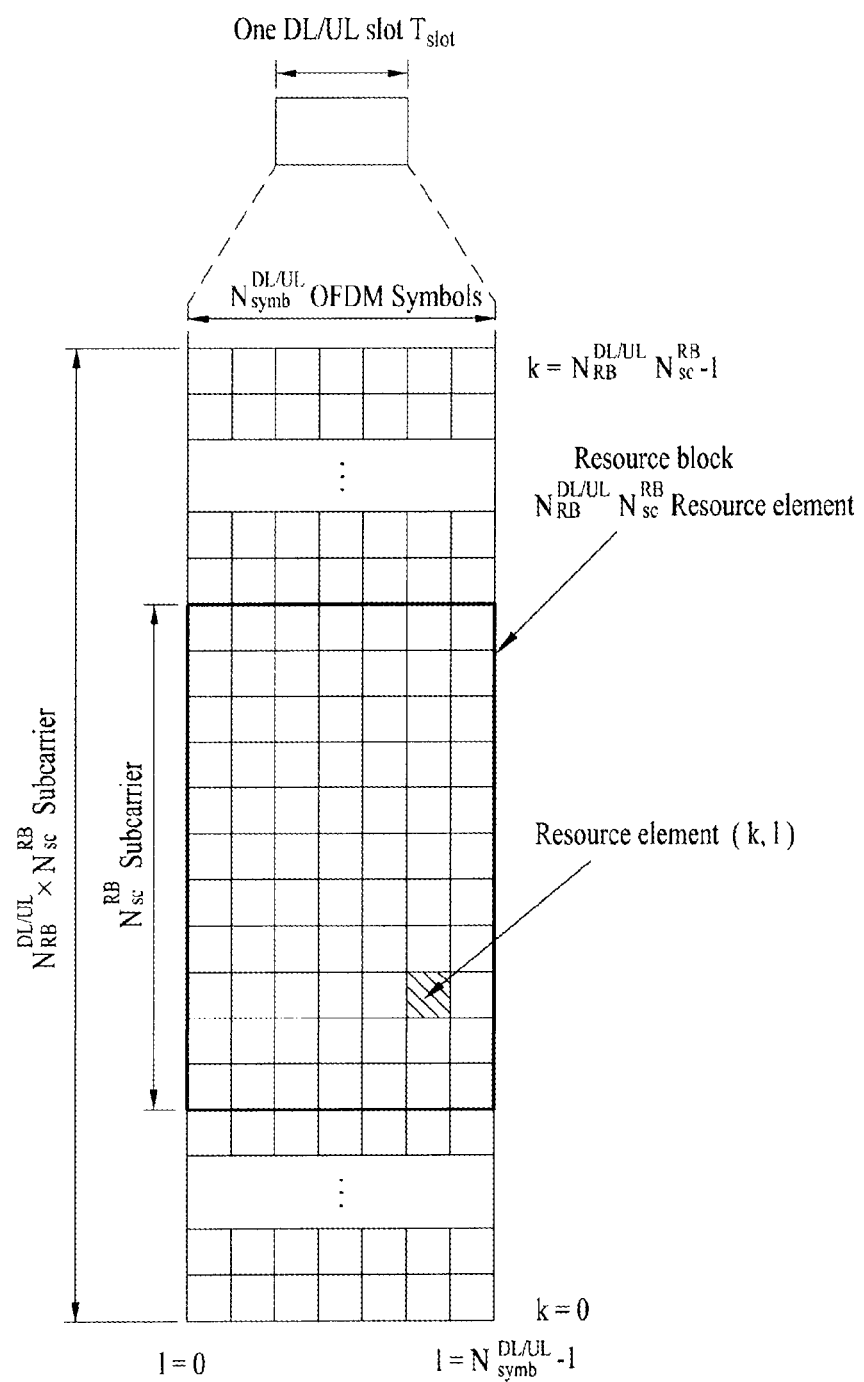
FIG. 2 illustrates a Downlink/Uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
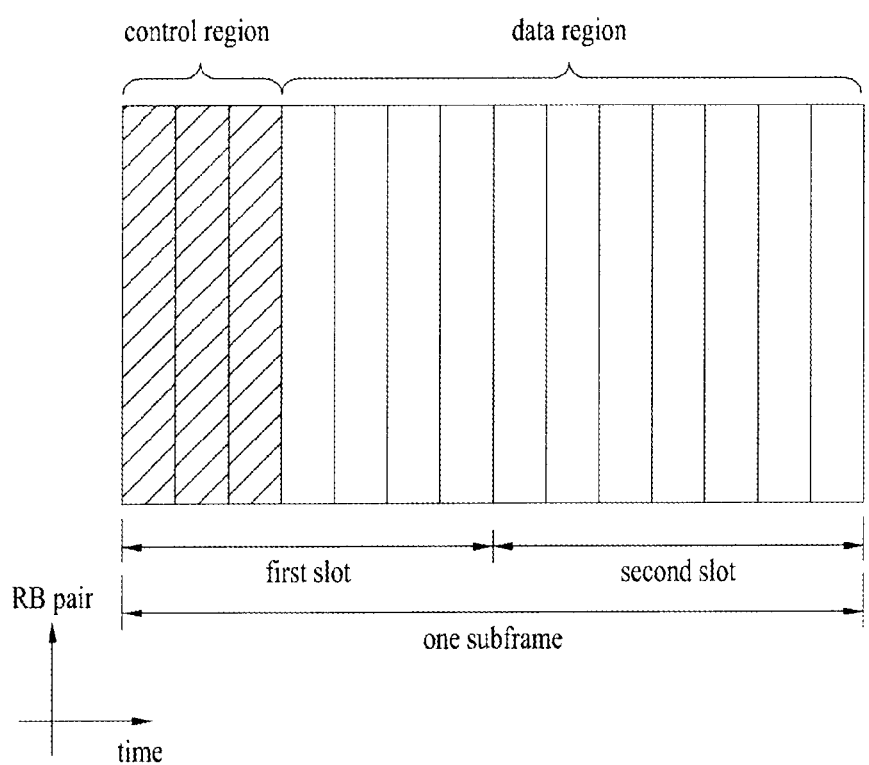
FIG. 3 illustrates an exemplary DL subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
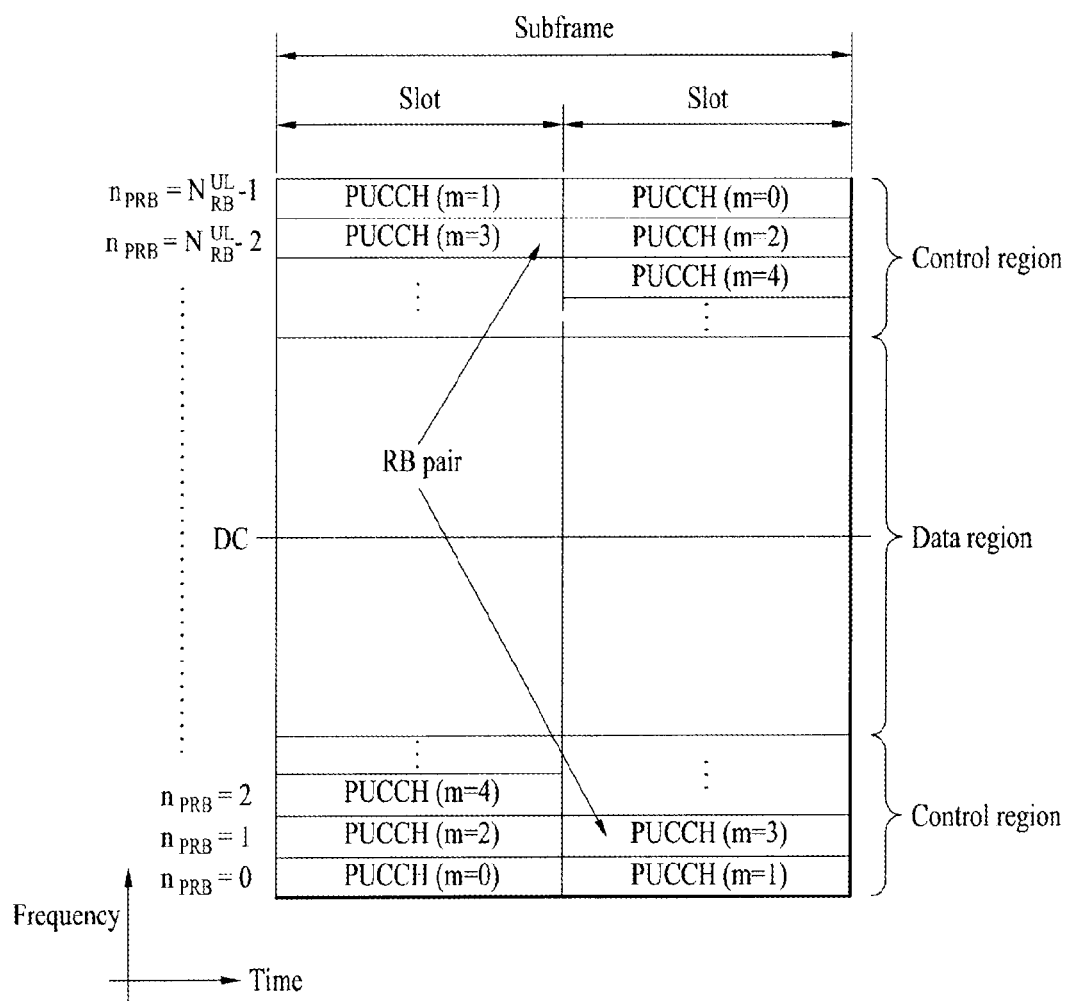
FIG. 4 illustrates an exemplary UL subframe structure used in a 3GPP LTE/LTE-A system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Downlink Channel State Information (CSI) Reporting

Open-loop MIMO operating without channel information and closed-loop MIMO are present in LTE. Particularly, in closed-loop MIMO, each of a transmitter and a receiver performs beamforming based on channel information, i.e., CSI, to acquire a multiplexing gain of MIMO antennas. To acquire CSI, an eNB instructs a UE to feed back DL CSI by allocating a Physical Uplink Control Channel (PUCCH) or a Physical Uplink Shared Channel (PUSCH) to the UE.

CSI is largely divided into a Rank Indicator (RI), a Precoding Matrix Index (PMI) and a Channel Quality Indicator (CQI). The RI indicates rank information of a channel and refers to the number of streams received by the UE through the same frequency time resources. The RI value is dependently determined by long-term fading of a channel and thus is fed back from the UE to the eNB with a longer cycle compared to the PMI and CQI values. The PMI is a value to which spatial characteristics of a channel are reflected and indicates a precoding index of an eNB preferred by the UE based on a metric such as SINR. The CQI indicates the intensity of a channel and refers to a reception SINR acquirable by the eNB using the PMI.

In an evolved communication system such as LTE-A, additional multi-user diversity is acquired using Multi-User MIMO (MU-MIMO). To this end, a higher accuracy is required in terms of channel feedback. This is because an interference channel is present between UEs multiplexed in the antenna domain in MU-MIMO and thus the accuracy of feedback channel greatly influences interference of not only a UE which gives feedback but also other multiplexed UEs. Accordingly, LTE-A determines to divide a final PMI into a long-term and/or wideband PMI, W1 and a short-term and/or subband PMI, W2 to increase the accuracy of a feedback channel.

As an example of hierarchical codebook transformation for forming a single final PMI based on the two channel information, a codebook may be converted using a long-term covariance matrix of a channel as given by Equation 1.

$$W = \text{norm}(W1 W2) \qquad \text{[Equation 1]}$$

In Equation 1, W2 (short-term PMI) is a codeword of a codebook configured to reflect short-term channel state information, W is a codeword of a converted final codebook, and norm(A) denotes a matrix in which the norm of each column of matrix A is normalized to 1.

W1 and W2 have structures as given by Equation 2.

$$W1(i) = \begin{bmatrix} X_i & 0 \\ 0 & X_i \end{bmatrix}, \qquad \text{[Equation 2]}$$

where $X_i$ is Nt/2 by M matrix.

$$W2(j) = \begin{bmatrix} \overbrace{e_M^k \quad e_M^l \quad e_M^m}^{r\ columns} \\ \alpha_j e_M^k \quad \beta_j e_M^l \quad \cdots \quad \gamma_j e_M^m \end{bmatrix} (\text{if rank} = r),$$

where $1 \le k, l, m \le M$ and $k, l, m$ are interger.

The above codeword structure is designed using cross polarized antennas and by reflecting correlation characteristics of a channel caused when antenna spacing is small (e.g., when the distance between neighboring antennas is less than a half of a signal wavelength). The cross polarized antennas can be divided into a horizontal antenna group and a vertical antenna group which have Uniform Linear Array (ULA) antenna characteristics and are co-located. Accordingly, correlation between antennas of each group has the same linear phase increment characteristics and correlation between antenna groups has phase rotation characteristics. Consequently, the codebook needs to be designed by reflecting characteristics of channels corresponding to sources because the codebook is composed of values acquired by quantizing the channels. For convenience of description, a rank-1 codebook formed in the above-described structure is given by Equation 3 and it is shown in Equation 3 that these channel characteristics are reflected to the codebook satisfying Equation 2.

$$W1(i) * W2(j) = \begin{bmatrix} X_i(k) \\ \alpha_j X_i(k) \end{bmatrix} \quad \text{[Equation 3]}$$

In Equation 3, the codeword is expressed as a vector of $N_t$ (the number of Tx antennas) by 1 and is divided into an upper vector $X_i(k)$ and a lower vector $\alpha_j X_i(k)$ respectively showing correlation characteristics of a horizontal antenna group and a vertical antenna group. $X_i(k)$ is preferably expressed as a vector having linear phase increment by reflecting correlation characteristics between antennas of each antenna group. A representative example thereof is a DFT matrix.

In LTE, CSI feedback schemes are divided into periodic reporting through an uplink control channel, e.g., PUCCH, and aperiodic reporting through an uplink data channel transmitted upon a request of an eNB, e.g., PUSCH. Aperiodic reporting is configured to each UE due to a request bit included in uplink scheduling information transmitted from the eNB to UEs. Each UE having received the uplink scheduling information transmits channel information in consideration of a transmission mode thereof through a PUSCH to the eNB. In the case of periodic reporting, a channel information transmission cycle and an offset in the corresponding cycle are signaled to each UE on a subframe basis through a higher layer signal, and channel information in consideration of a transmission mode of each UE is transmitted to the eNB through a PUCCH in a fixed cycle. If uplink data transmission is present in a subframe for transmitting channel information in the fixed cycle, the corresponding channel information is transmitted through an uplink data channel (PUSCH) instead of an uplink control channel (PUCCH) together with the data.

A detailed description is now given of periodic reporting of channel information. Reporting modes are classified into four modes according to CQI and PMI feedback type as shown in Table 3.

TABLE 3

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

The reporting modes are classified into a WideBand (WB) CQI and a SubBand (SB) CQI according to CQI feedback type and classified into no PMI and single PMI according to whether a PMI is transmitted. Each UE receives information indicating a combination of a transmission cycle and an offset through RRC signaling from a higher layer. For example, a UE transmits channel information as shown in FIG. 5(a) upon receiving information indicating a combination of a cycle of '5' and an offset of '1'.

Figure 5:
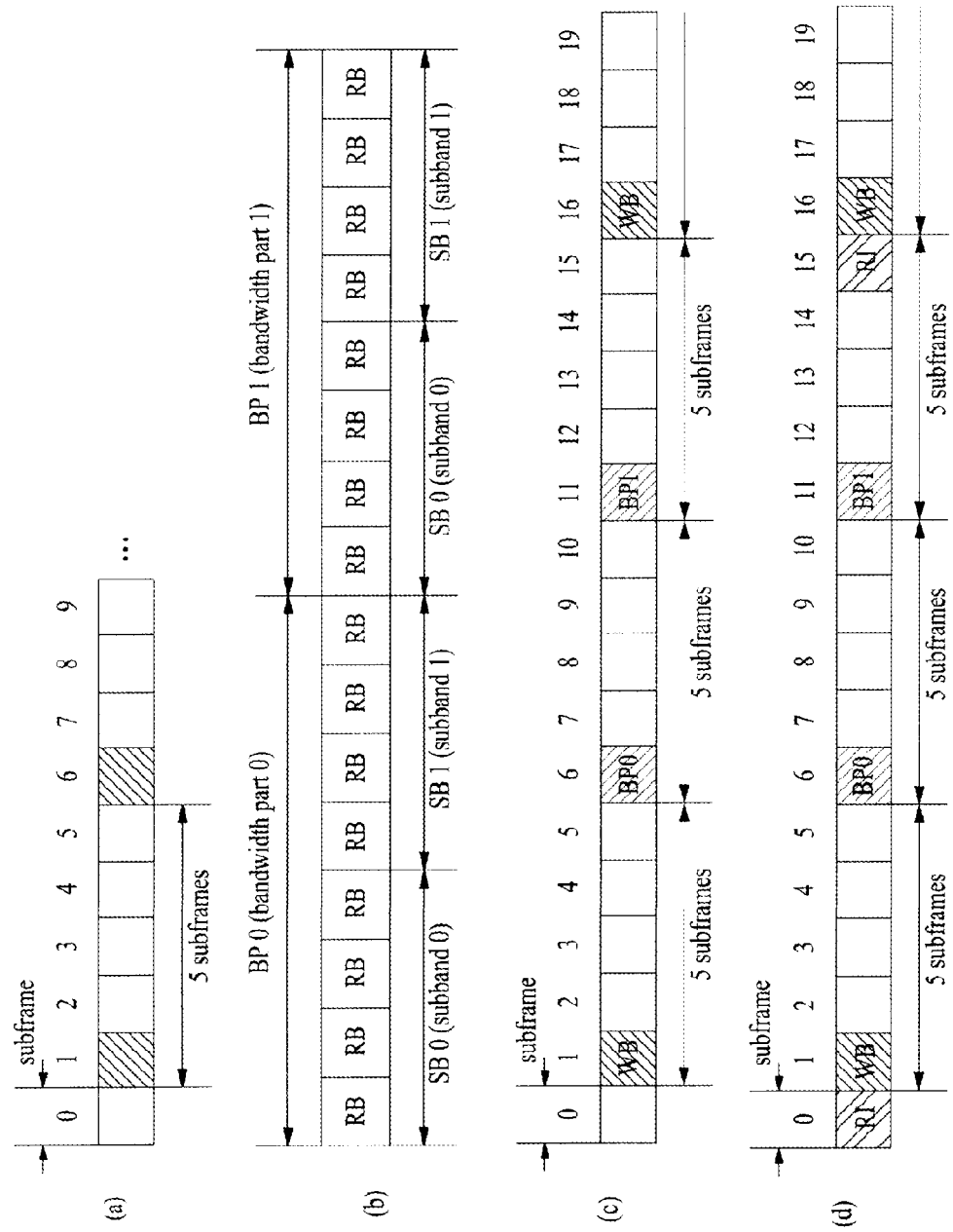
FIG. 5 illustrates exemplary downlink channel state reporting.

Upon receiving the information indicating a combination of a cycle of '5' and an offset of '1' as shown in FIG. 5(a), the UE transmits channel information every 5 subframes through a PUCCH with 1 subframe offset in a direction in which a subframe index increases based on subframe 0. In this case, since a subframe index is composed of a combination of a system frame number ($n_f$) and 20 slot indices ($n_s$ ranging from 0 to 19) within a system frame and one subframe includes 2 slots, the subframe index may be expressed as $10*n_f+\text{floor}(n_s/2)$.

CQI feedback types include a type for transmitting the WB CQI only and a type for transmitting both the WB CQI and the SB CQI. In the type for transmitting the WB CQI only, WB CQI information of the entire band is transmitted in a subframe corresponding to every CQI transmission cycle. The WB periodic CQI transmission cycle may be configured to {2, 5, 10, 16, 20, 32, 40, 64, 80, 160} ms or no transmission. In this case, when a PMI also needs to be transmitted according to the PMI feedback type in Table 1, PMI information is transmitted together with CQI information. In the type for transmitting both the WB CQI and the SB CQI, the WB CQI and the SB CQI are alternately transmitted. A detailed description thereof is now given with reference to FIG. 5(b).

FIG. 5(b) illustrates an exemplary system including 16 Resource Blocks (RBs). In the case of the system having a system frequency bandwidth of 16 RBs, the system frequency bandwidth includes 2 Bandwidth Parts (BPs) (e.g., BP0 and BP1) and each BP includes 2 SubBands (SBs) (e.g., SB0 and SB1) each including 4 RBs. In this case, the number of BPs and the size of each SB are determined depending on the number of RBs of system frequency bandwidth, and the number of SBs of each BP is determined depending on the number of RBs, the number of BPs and the size of an SB.

In the type for transmitting both the WB CQI and the SB CQI, the WB CQI is transmitted in a CQI transmission subframe, a CQI of an SB having better channel state between SB0 and SB1 in BP0 and an index of the corresponding SB are transmitted in a subsequent transmission subframe, and a CQI of an SB having better channel state between SB0 and SB1 in BP1 and an index of the corresponding SB are transmitted in a next subsequent transmission subframe. As described above, the WB CQI is transmitted and then the CQI information of the BPs are sequentially transmitted. In this case, BP CQI information can be sequentially transmitted one to four times between transmission of a WB CQI and transmission of a subsequent WB CQI. For example, if the BP CQI information are transmitted one time, the CQI information is transmitted in the order of WB CQI→BP0 CQI→BP1 CQI→WB CQI and the BP CQI information are sequentially transmitted one time between two WB CQIs. As another example, if the BP CQI information are transmitted four times, the CQI information is transmitted in the order of WB CQI→BP0 CQI→BP1 CQI→BP0 CQI→BP1 CQI→BP0 CQI→BP1 CQI→BP0 CQI→BP1 CQI→WB CQI and the BP CQI information are sequentially transmitted four times between two WB CQIs. Information about the number of sequential transmissions is signaled by a higher layer and transmitted through a PUCCH only in a subframe corresponding to information indicating a combination of a cycle and an offset signaled by a higher layer as described above in relation to FIG. 5(a), irrespective of the WB CQI or the SB CQI. In this case, when a PMI also needs to be transmitted according to the PMI feedback type, PMI information is transmitted together with CQI information. If a PUSCH for uplink data transmission is present in the corresponding subframe, the PMI is transmitted through the PUSCH instead of the PUCCH together with data.

FIG. 5(c) illustrates CQI transmission when both a WB CQI and an SB CQI are transmitted and information indicating a combination of a period of '5' and an offset of '1' is signaled as shown in FIG. 5(a).

In the case of transmission of an RI, the RI is signaled as a combination of a transmission cycle corresponding to a multiple of a WB CQI transmission cycle and an offset in the transmission cycle. At this time, the offset is a relative offset with respect to a CQI transmission offset. For example, when the offset of the CQI is '1' and the offset of the RI is '0', the RI has the same offset as the CQI. The offset of the RI is defined as 0 or a negative value.

FIG. 5(d) illustrates a case in which an RI transmission cycle corresponds to a WB CQI transmission cycle and an RI offset is '-1' in the same environment as FIG. 5(c). Since the RI transmission cycle equals the WB CQI transmission cycle and the RI offset is '-1' with respect to the CQI offset of '1' in FIG. 5(c), the RI is transmitted based on subframe 0. If the RI offset is '0' instead of '-1', a WB CQI transmission subframe and an RI transmission subframe actually overlap. In this case, the WB CQI is dropped and the RI is transmitted.

The CQI, PMI and RI are transmitted as the above combination by each UE according to RRC signaling of a higher layer. An eNB needs to transmit information appropriate for each UE to the UE in consideration of channel state of the UE, UE distribution state within the eNB, etc.

Figure 6:
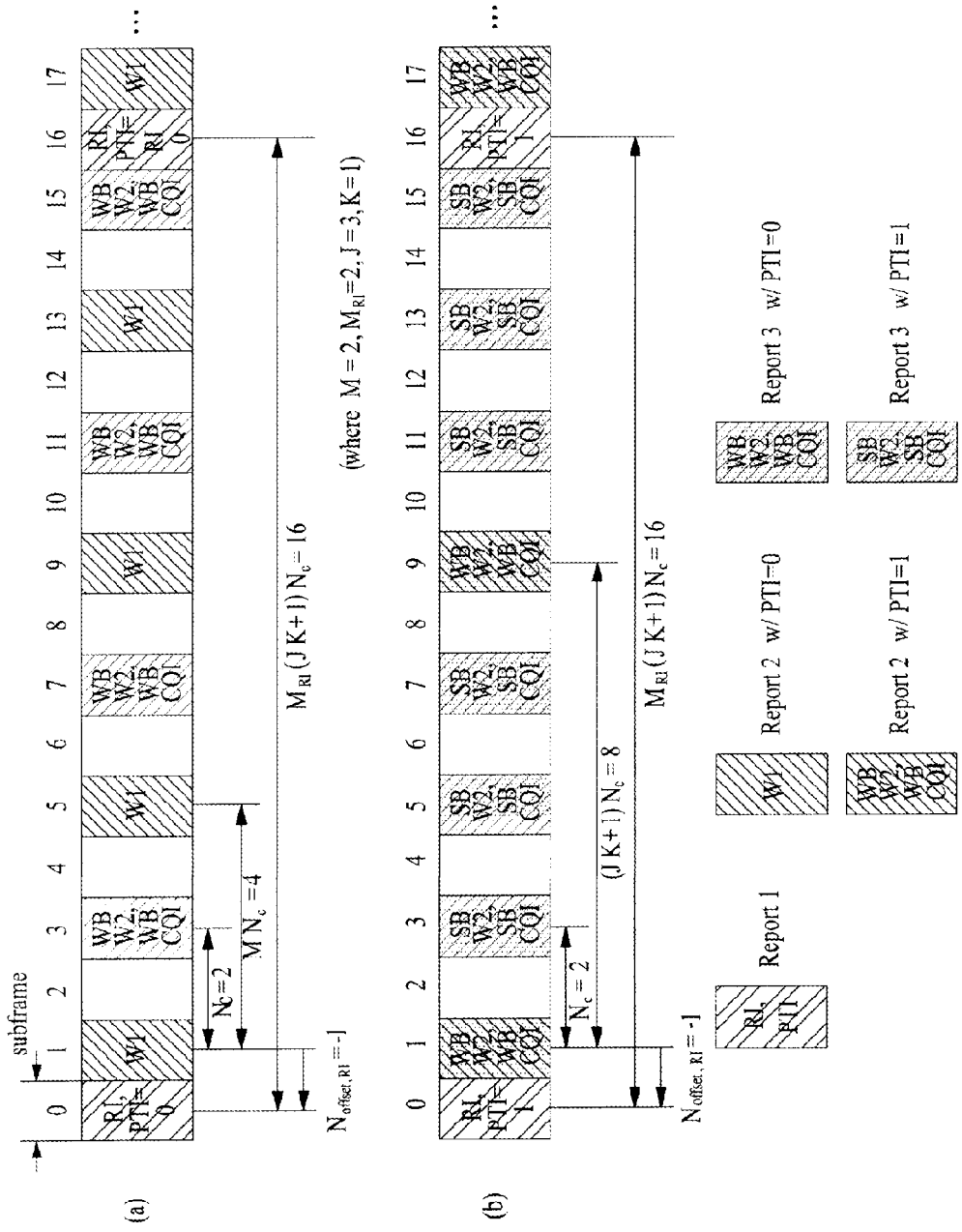
FIG. 6 illustrates another exemplary downlink channel state reporting.

In the case of Mode 2-1 of Table 3, LTE-A configures a 1-bit indicator, e.g., Precoder Type Indication (PTI) parameter, and considers two subdivided periodic reporting modes according to the PTI value as illustrated in FIG. 6. In this case, W1 and W2 represent the above-described hierarchical codebook and both W1 and W2 need to be determined to set a precoding matrix W accomplished by combining W1 and W2.

That is, in the case of periodic reporting Mode 2-1 as shown in FIG. 6, different reports corresponding to Report 1, Report 2 and Report 3 are transmitted in different repetition cycles. Specifically, Report 1 reports an RI and a 1-bit PTI value, Report 2 reports WB W1 (when PTI=0) or WB W2 and a WB CQI (when PTI=1), and Report 3 reports WB W2 and a WB CQI (when PTI=0) or SB W2 and an SB CQI (when PTI=1).

Initially, Report 2 and Report 3 are transmitted in subframes having subframe indices which satisfy $(10*n_f+\text{floor}(n_s/2)-N_{offset, CQI}) \mod (N_{pd})=0$. In this case, $N_{offset,CQI}$ corresponds to the offset value shown in FIG. 5(a). $N_{pd}$ denotes subframe spacing between neighboring Reports 2 or Reports 3, and FIG. 6 illustrates an exemplary case in which $N_{pd}=2$.

Specifically, the location of Report 2 is designated as subframe indices that satisfy $(10*n_f+\text{floor}(n_s/2)-N_{offset,CQI}) \mod (H \cdot N_{pd})=0$. As such, Report 2 is transmitted at every $H \cdot N_{pd}$ and subframes between neighboring Reports 2 are used for Report 3 transmission. In this case, when PTI=0, H=M and M is determined through higher layer signaling. M=2 is used as an example in FIG. 6. When PTI=1, H=J·K+1. In this case, K is determined through higher layer signaling and J denotes the number of BPs. J=3 and K=1 are used as an example in FIG. 6.

Enhanced PDCCH (EPDCCH)

Owing to introduction of a multi-node system, various communication techniques have become available, thereby improving channel quality. However, a new control channel is required to apply Multiple-Input Multiple-Output (MIMO) and Coordinated Multi-Point (CoMP) to the multi-node environment. In this context, Enhanced-Physical Downlink Control Channel (EPDCCH) is under discussion and it is regulated that the EPDCCH is assigned to a data region (hereinafter referred to as a PDSCH region) rather than a legacy control region (hereinafter referred to as a PDCCH region). Consequently, since the EPDCCH enables transmission of control information for a node to each UE, lack of the legacy PDCCH region may be solved. For reference, the EPDCCH is not provided to legacy UEs and only LTE-A UEs can receive the EPDCCH.

Figure 7:
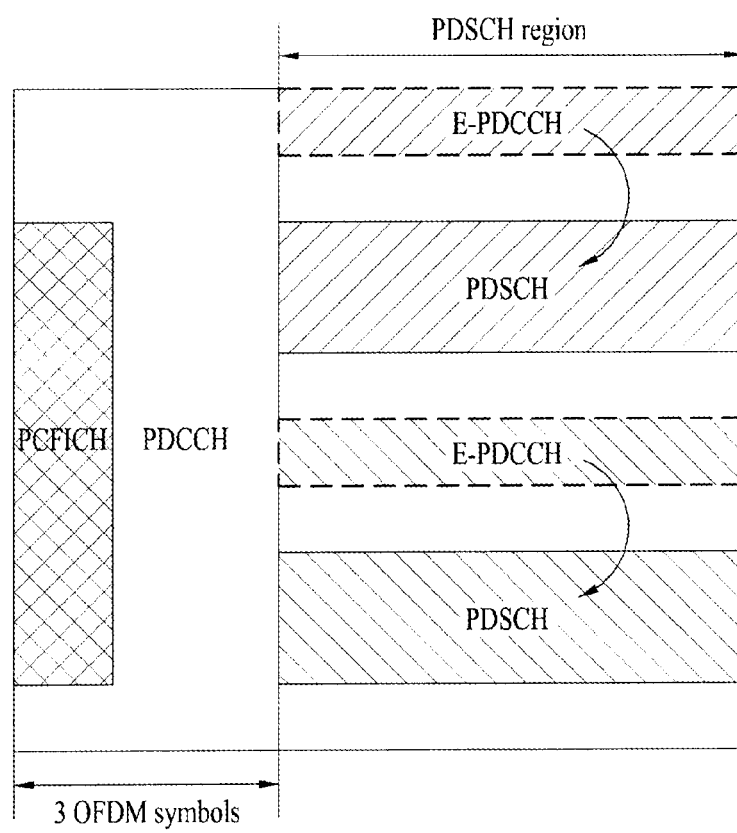
FIG. 7 illustrates an Enhanced-Physical Downlink Control Channel (EPDCCH) and a Physical Downlink Shared Channel (PDSCH) scheduled by the EPDCCH.

FIG. 7 is a view illustrating an EPDCCH and a PDSCH scheduled by the EPDCCH.

Referring to FIG. 7, an EPDCCH may be defined in a portion of a PDSCH region in which data is generally transmitted, and a UE should perform blind decoding to detect whether an EPDCCH directed to the UE is present. The EPDCCH performs scheduling operation (e.g., PDSCH and PUSCH control) like a legacy PDCCH. However, if the number of UEs connected to the same node such as a Remote Radio Head (RRH) is increased, a larger number of EPDCCHs are assigned to the PDSCH region and thus the number of times that blind decoding should be performed by the UE is increased, thereby increasing complexity.

A method for multiplexing EPDCCHs for a plurality of UEs needs to be considered. Specifically, a multiplexing technique for cross-interleaving EPDCCHs of multiple UEs in the frequency domain or the time domain while a common resource region, i.e., a common PRB set, is configured has been suggested.

Figure 8:
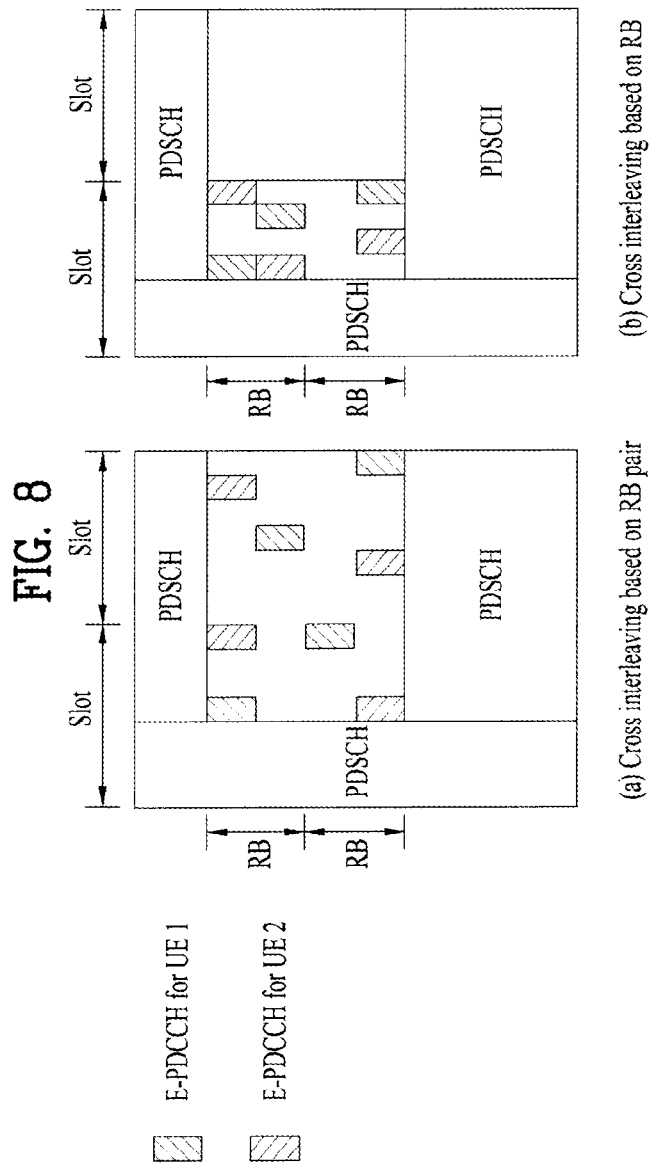
FIG. 8 illustrates a method for multiplexing EPDCCH for a plurality of UEs.

FIG. 8 is a view illustrating a method for multiplexing EPDCCHs for a plurality of UEs.

Specifically, FIG. 8(a) illustrates an example in which a common PRB set is configured on a PRB pair basis and cross interleaving is performed based on the PRB pair. On the other hand, FIG. 8(b) illustrates an example in which a common PRB set is configured on a PRB basis and cross interleaving is performed based on the PRB. This scheme has an advantage of acquiring a diversity gain in terms of the frequency/time domain over a plurality of RBs.

The present invention proposes a method for feeding back Channel State Information (CSI) for Enhanced PDCCH (EPDCCH) link adaptation.

An EPDCCH refers to a PDCCH transmitted in a legacy PDSCH region to increase the capacity of a control region as described above, and has an advantage of achieving a beamforming gain using a UE-specific RS. Link adaptation means that an eNB adjusts a data rate adaptively to channel capacity of a link per a UE, and channel information feedback means that a UE reports information about a channel experienced by the UE to an eNB for link adaptation. In this case, the channel information reported by the UE include information such as CQI, PMI and PI, and a frequency unit for reporting the channel information may be a whole system frequency region or a specific frequency region, e.g., SubBand (SB).

The present invention proposes a method for feeding back channel information in, particularly, a frequency region used for EPDCCH transmission with priority compared to a frequency region used only for PDSCH transmission. The reason why channel information should be fed back in an EPDCCH frequency region because unique benefits of an EPDCCH cannot be achieved by link adaptation using only average channel information of a whole frequency band as in a legacy PDCCH. Accordingly, when an eNB determines an aggregation level L of Downlink Control Information (DCI) transmitted through the EPDCCH, channel information of an EPDCCH frequency region is needed in addition to average channel information of a whole system band.

Figure 9:
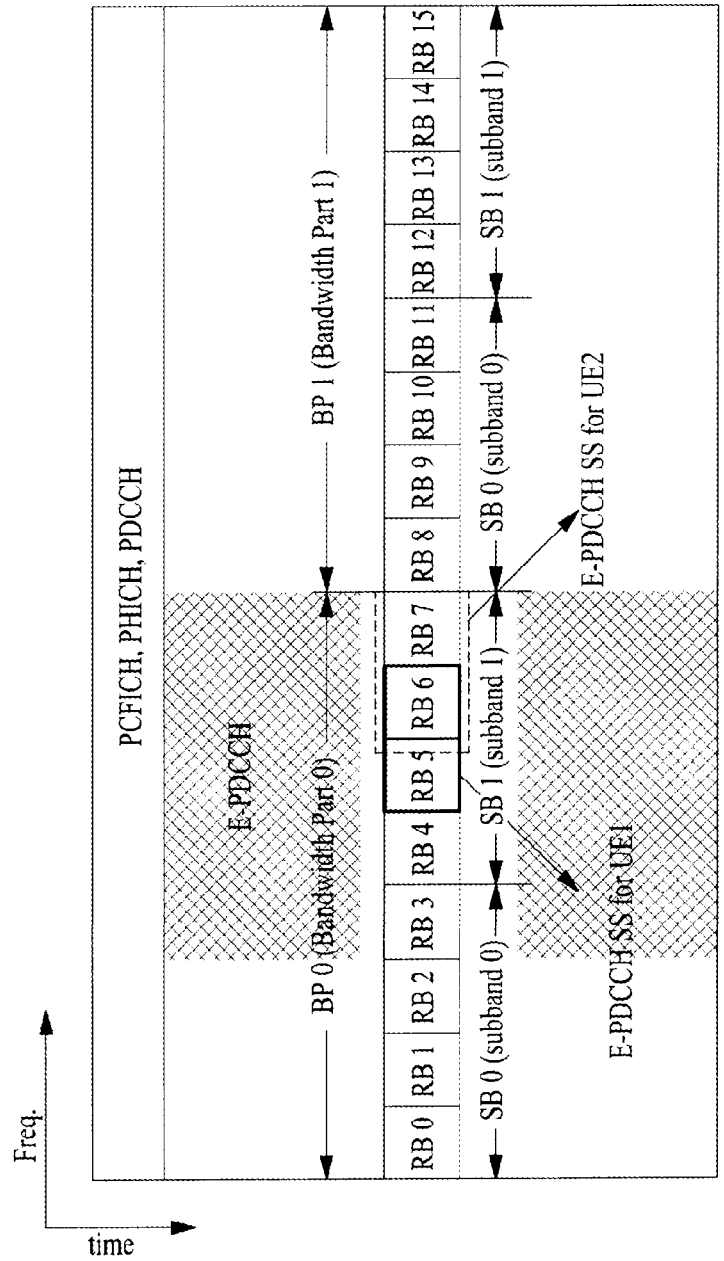
FIG. 9 illustrates the concepts of a Bandwidth Part (BP) and a SubBand (SB)

As a specific method for feeding back channel information in an EPDCCH frequency region, feedback in the EPDCCH frequency region has priority compared to feedback in a PDSCH frequency region. In the case of PDSCH, if CQI information of a SB region is used, data is transmitted in a localized manner using an appropriate Modulation and Coding Scheme (MCS) level. A SB refers to a frequency region corresponding to each of a plurality of subsets of a set of RBs for configuring a system frequency region as illustrated in FIG. 9. On the other hand, in the case of EPDCCH, if CQI information of an SB transmitted by a UE does not include RBs used as an EPDCCH Search Space (SS), the state of a control channel for the corresponding UE may not be fed back. Accordingly, a feedback mechanism capable of ensuring that channel feedback of an EPDCCH SS is provided to an eNB more than a certain number of times is necessary.

A method for reporting channel information of RBs used as an EPDCCH SS by a UE includes a direct scheme and an indirect scheme. The direct scheme refers to a method for explicitly configuring a channel information feedback scheme and a resource for an EPDCCH by an eNB. The indirect scheme refers to a method using PDSCH channel feedback and, more particularly, a method for feeding back EPDCCH channel information in the same manner as PDSCH channel state information.

Embodiment 1. Direct Scheme for CSI Reporting

The direct scheme refers to a method by which an eNB signals a UE when and how to report channel information of a subband (or PRB) including an EPDCCH (or including an SS of the UE). Accordingly, the eNB specifies EPDCCH channel information feedback and signals a reporting scheme corresponding thereto and a resource to be used. The direct scheme may be subdivided into an aperiodic scheme and a periodic scheme. EPDCCH CSI feedback may coexist with PDSCH CSI feedback.

1-1. Aperiodic Scheme

The aperiodic scheme refers to a method by which a UE transmits channel information using a designated reporting scheme and a designated resource in response to a CSI report request of an eNB. In this case, the CSI report request is for an EPDCCH SB (RB). For example, a CQI request bit of a UL grant may be configured as in PDSCH channel information feedback, and the resource for CSI reporting may be indicated through the UL grant. In this case, the reporting scheme is signaled as a feedback mode, and a new feedback mode for an EPDCCH is defined and used. The new feedback mode may be referred to as 4-0 or 4-1 and may be defined similarly to a legacy channel information feedback scheme. Table 4 shows examples thereof.

TABLE 4

| | | PMI Feedback Mode | |
|---|---|---|---|
| | | No PMI | with PMI |
| PUSCH CQI Feedback Mode | Wideband (wideband CQI) | | Mode 1-2<br>RI<br>$1^{st}$ WB CQI(4 bit)<br>$2^{nd}$ WB CQI(4 bit) if RI > 1<br>N*SB PMI |
| | UE Selected (subband CQI) | Mode 2-0<br>RI<br>$1^{st}$ WB CQI(4 bit) + Best-M CQI(2 bit)<br>Best-M index(L bit) | Mode 2-2<br>RI<br>$1^{st}$ WB CQI(4 bit) + Best-M CQI(2 bit) + Best-M index(L bit)<br>$2^{nd}$ WB CQI(4 bit) + Best-M CQI(2 bit) if RI > 1<br>WB PMI + Best-M PMI<br>Best M index (L bit) |
| | Higher layer configured (subband CQI) | Mode 3-0<br>RI<br>WB CQI(4 bit) + N*SB(2 bit) | Mode 3-1<br>RI<br>$1^{st}$ WB CQI(4 bit) + N*SB(2 bit)<br>$2^{nd}$ WB CQI(4 bit) + N*SB(2 bit) if RI > 1<br>WB PMI |
| | EPDCCH (subband CQI) | | Mode 4-1<br>RI<br>$1^{st}$ WB CQI(4 bit) + M*EPDCCH SB(2 bit)<br>$2^{nd}$ WB CQI(4 bit) + M*EPDCCH SB(2 bit)<br>if RI > 1<br>N*SB PMI |
| | EPDCCH (subband CQI) | Mode 4-0<br>RI<br>WB CQI(4 bit) + M*EPDCCH SB CQI(2 bit) + (N − M)*SB(2 bit) | Mode 4-1<br>RI<br>$1^{st}$ WB CQI(4 bit) + M*EPDCCH SB CQI(2 bit) + (N − M)*SB CQI(2 bit)<br>$2^{nd}$ WB CQI(4 bit)) + M*EPDCCH SB CQI (2 bit) + (N − M)*SB CQI (2 bit) if RI > 1 |

TABLE 4-continued

| PMI Feedback Mode | |
|---|---|
| No PMI | with PMI |
| | EPDCCH PMI WB PMI |

A method capable of replacing PUSCH CQI/PMI feedback mode 1-2 is a method for reporting CQI of M EPDCCH SBs in addition to WB CQI and N SB PMIs. The EPDCCH SB refers to an SB configured with an EPDCCH. A CQI of the EPDCCH SB is defined as a differential value from the value of the WB. In the case of EPDCCH rank 1, 1 differential value is enough. M may be a value corresponding to EPDCCH SBs or an upper limit value configured by an eNB.

As a method capable of replacing PUSCH CQI/PMI feedback mode 3-0 or 3-1, N SBs may be configured to include M (>=1) EPDCCH SBs. A specific resource location is assigned for EPDCCH SB reporting. For example, when CSI information of N SBs is fed back together with WB, if M=1, information corresponding to a 5-6th bit may be specified as information about an EPDCCH SB.

As another example, a new feedback type may be defined. In this case, CSI feedback of an EPDCCH which is a control channel and CSI feedback of a PDSCH which is a data channel may be controlled independently. At this time, a feedback request may be given by, for example, adding an EPDCCH CQI request bit to a UL grant.

An SB reported by a UE may be restricted to an EPDCCH SB. If the number of EPDCCH SBs is greater than 1, CQI values corresponding to the number of corresponding EPDCCH SBs may be reported. The case in which the number of EPDCCH SBs is greater than 1 is applicable to both a case in which an EPDCCH SS extends over two or more SBs in view of a UE and a case in which an EPDCCH RB region extends over two or more SBs in view of an eNB. A feedback frequency granularity is not always on an SB basis. The granularity may be changed according to definition. For example, if feedback of N RBs is defined, when the EPDCCH SS extends over a plurality of RBs/a plurality of SBs, the UE feeds back CSI of RBs included in the SS irrespective of the form thereof. In this case, if the number of RBs included in the SS exceeds a maximum value M, the UE reports CSI of only upper M RBs having good channel state.

1-2. Periodic Scheme

The periodic scheme refers to a method by which a UE transmits channel information in a designated cycle using a designated resource and a designated reporting scheme in response to a CSI request of an eNB. For example, the UE may be configured to report the channel information in a designated periodic feedback mode using PUCCH format 2. In this case, new feedback modes for an EPDCCH are defined and used. The new feedback modes may be referred to as 4-0 and 4-1 and may be defined similarly to a legacy channel information feedback scheme. The new feedback modes 4-0 and 4-1 may be defined as shown in Table 5.

TABLE 5

| | | PMI Feedback Mode | |
|---|---|---|---|
| | | No PMI | Single PMI |
| PUCCH CQI Feedback Mode | Wideband (wideband CQI) | Mode 1-0 | Mode 1-1 |
| | UE Selected (subband CQI) | Mode 2-0 RI WB CQI(4 bit) Best-1 CQI(4 bit) in each BP Best-1 index(L bit) | Mode 2-1 RI $1^{st}$ WB CQI(4 bit) $2^{nd}$ WB spatial CQI(3 bit) for RI > 1 Best-1 CQI(4 bit) in each BP Best-1 spatial CQI(3 bit) for RI > 1 Best-1 index(L bit) |
| | E-PDCCH (subband CQI) | Mode 4-0 RI WB CQI(4 bit) EPDCCH SB CQI(2 bit) Best-1 CQI(4 bit) in each BP Best-1 index(L bit) | Mode 4-1 RI $1^{st}$ WB CQI(4 bit) $2^{nd}$ WB spatial CQI(3 bit) for RI > 1 WB PMI(4 bit) EPDCCH SB CQI(2 bit) EPDCCH SB PMI(4 bit) Best-1 CQI(4 bit) in each BP Best-1 spatial CQI(3 bit) for RI > 1 Best-1 index(L bit) |

A method capable of replacing PUCCH CQI/PMI feedback mode 2-0 or 2-1 is a method for repeating a bandwidth part (BP) including an EPDCCH SB one more time when BP sequential feedback is performed. Accordingly, the BP including the EPDCCH SB is fed back two times. This serves to additionally report CSI of the EPDCCH SB using one of the first and second feedbacks. The eNB should configure one of the first and second feedbacks to report the CSI of the EPDCCH SB.

As a method capable of replacing PUCCH CQI/PMI feedback mode 2-0 or 2-1, a BP including an EPDCCH SB may be configured to report CSI of the EPDCCH SB. In this case, the corresponding BP may always report the CSI of the EPDCCH SB. Alternatively, if the corresponding BP performs a total of N feedbacks, the BP may feed back an SB having the best channel quality N−1 times as in a legacy scheme and should feed back the CSI of the EPDCCH SB one time. In this case, one of the first through Nth feedbacks may be configured to report the CSI of the EPDCCH SB.

An example of Table 5 is illustrated in FIG. 9. FIG. 9 illustrates an EPDCCH region and SS regions of UEs in a frequency region including 16 RBs.

Figure 10:
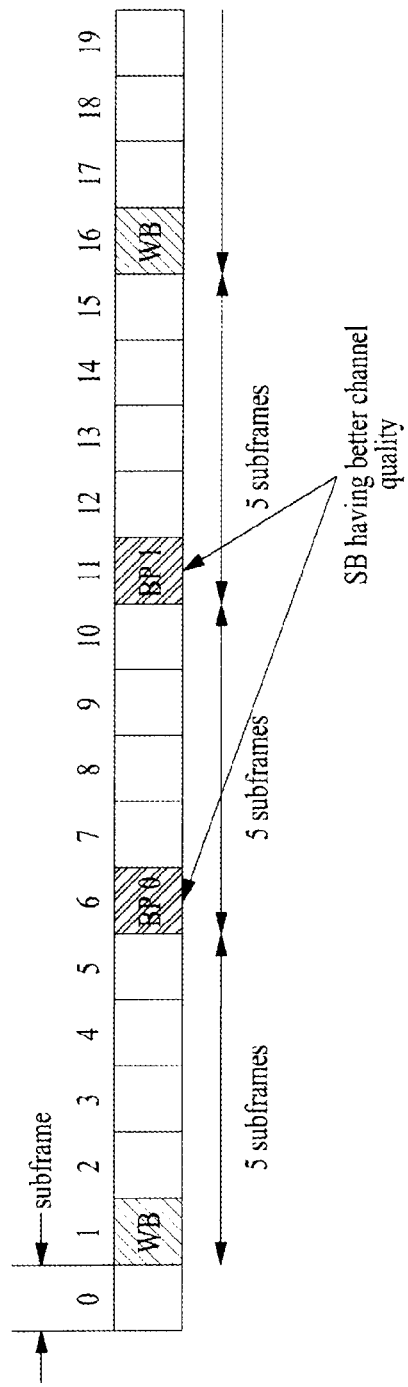
FIG. 10 illustrates exemplary channel state reporting according to an embodiment of the present invention.

UE 1 may report CSI of an SB having the best channel quality in each BP. In this case, assuming that a reporting cycle is 5*subframes and a reporting offset is 1*subframe, as illustrated in FIG. 10, UE 1 reports CQI of a WB and SBs in a 5 subframe cycle and CQI reported by each BP is CQI of an SB having the best channel quality in the corresponding BP. In this case, reporting of the first SB may be determined as reporting for the EPDCCH (FIG. 11(a)).

Alternatively, UE 1 may be configured to periodic feedback mode 4 to sequentially transmit CQI information of BPs by a total number of BPs+1. If each BP is circulated one time within reporting for the WB, reporting for 3 SBs may be present between reporting for 2 EPDCCH WBs. In this case, the location of EPDCCH reporting is additionally determined. In this case, assuming that reporting is performed by repeating the BP including the EPDCCH SB two times, the first reporting may be determined as reporting for the EPDCCH (FIG. 11(b)).

Figure 11:
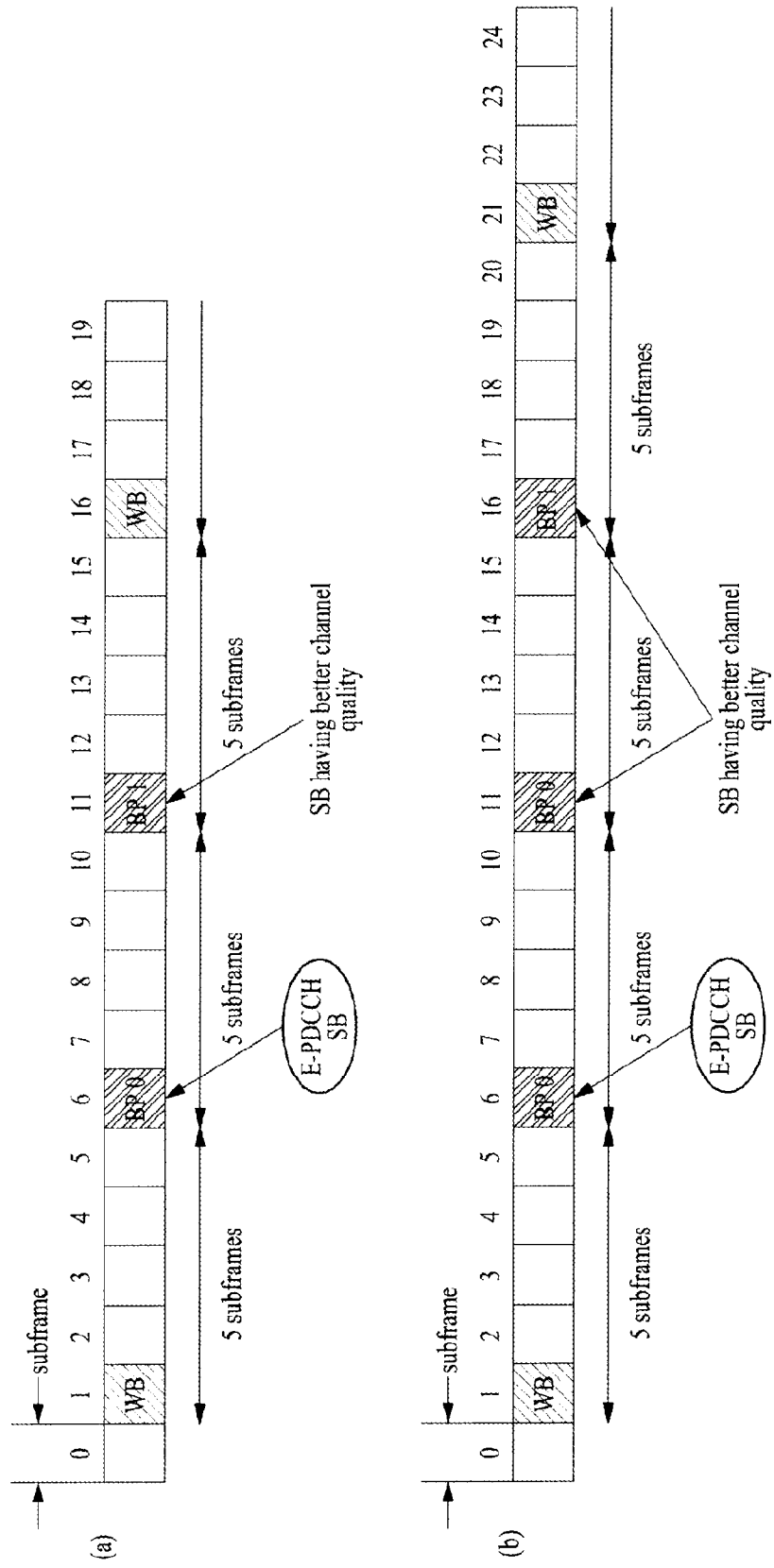
FIG. 11 illustrates exemplary channel state reporting according to another embodiment of the present invention.

Since the first BP, BP 0 includes the EPDCCH SB in FIG. 9, two examples thereof are illustrated in FIG. 11.

Figure 12:
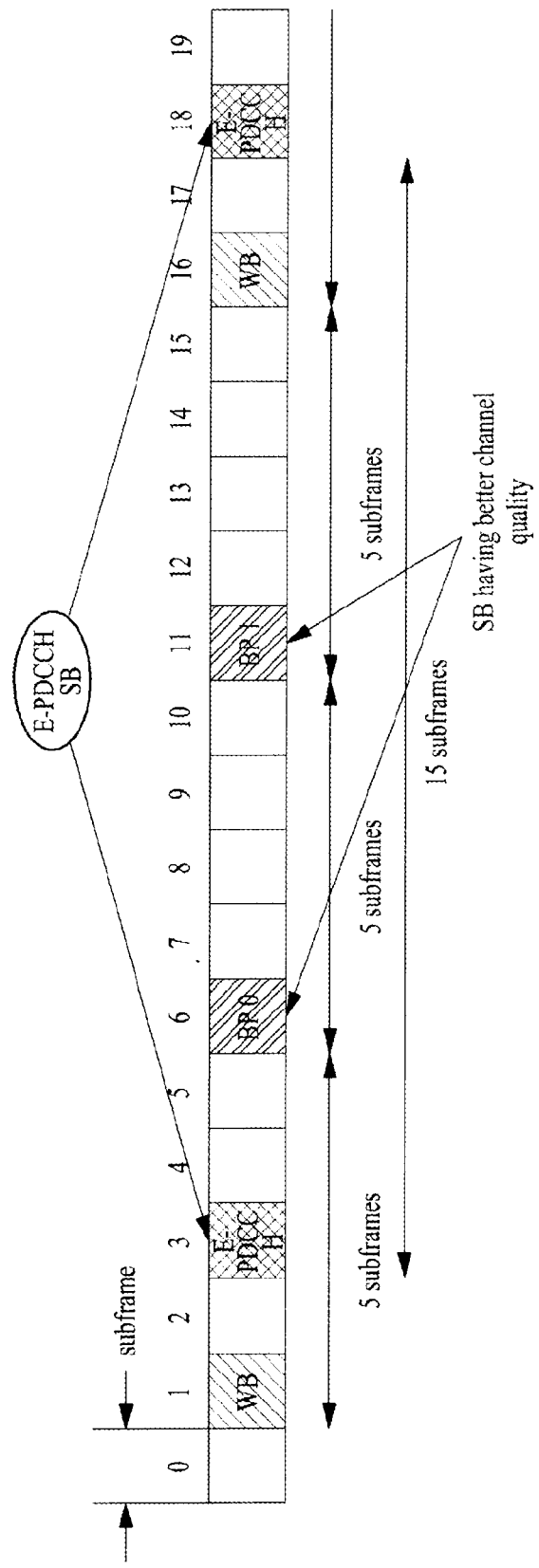
FIG. 12 illustrates exemplary channel state reporting according to another embodiment of the present invention.

As another method, a cycle and an offset for reporting CSI of an EPDCCH SB may be designated differently from a cycle and an offset for reporting CSI of a PDSCH. FIG. 12 illustrates that cycle=15 ms and offset=3 ms are configured for CSI feedback of an EPDCCH SB. As illustrated in FIG. 1, one subframe corresponds to 1ms on the time axis.

Figure 13:
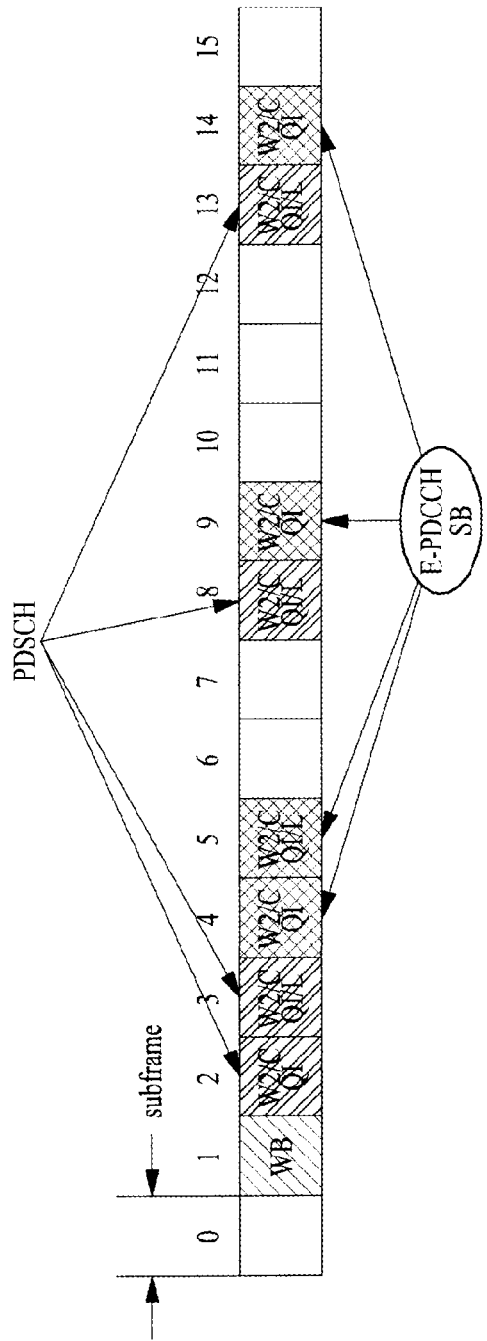
FIG. 13 illustrates exemplary channel state reporting according to another embodiment of the present invention.

FIG. 13 illustrates an exemplary case in which EPDCCH channel information feedback and PDSCH channel information feedback are transmitted independently of each other.

If the direct scheme is used, since EPDCCH feedback is independent of PDSCH feedback, even when the EPDCCH has rank 1 and the PDSCH has rank 2 or above, EPDCCH feedback may always be fixed to rank 1 irrespective of the rank of the PDSCH. A separate PMI may be fed back using a precoder to be assumed when a CQI of the EPDCCH is calculated. Alternatively, a CQI of a case in which column vectors of a precoder matrix of the PDSCH are randomly used is calculated.

Embodiment 2. Indirect Scheme for CSI Reporting

The indirect scheme refers to a method for reporting feedback of a PDSCH SB instead of feedback of an EPDCCH SB when feedback of a PDSCH is constantly used and a UE is EPDCCH enabled. The indirect scheme is also subdivided into an aperiodic scheme and a periodic scheme.

2-1. Aperiodic Scheme

The aperiodic scheme may use PUSCH CQI/PMI feedback mode 3-0 or 3-1, or feedback mode 2-0 or 2-1 in Table 4.

When PUSCH CQI/PMI feedback mode 3-0 or 3-1 is used, this case is the same as the case of N=1 according to the aperiodic scheme of the direct scheme and an SB configured by an eNB in this case corresponds to an EPDCCH SB.

As another method using PUSCH CQI/PMI feedback mode 3-0 or 3-1, if N>1, the EPDCCH SB is included in N SBs configured by the eNB.

When PUSCH CQI/PMI feedback mode 2-0 or 2-1 is used, to feed back channel information of M SBs having the best channel quality measured by a UE, if M=1, the UE configures the SB having the best channel quality as the EPDCCH SB. If M>1, the EPDCCH SBs are included in the M SBs and the UE calculates and reports an average of CQI values of the M SBs. In this case, since indices of the M SBs having the best channel quality are also reported, an index of the EPDCCH SB may also be reported.

2-2. Periodic Scheme

The periodic scheme may use PUCCH feedback mode 2-0 or 2-1 of Table 5.

In PUCCH CQI/PMI feedback mode 2-0 or 2-1, reporting points have a specific cycle and CSI of BPs are sequentially reported. At a reporting point of each BP, an SB having the best channel quality in the corresponding BP is selected and channel information thereof is reported together with an SB index. If any BP has an SB including an RB used for an EPDCCH SS, a UE reports channel information of the SB including the EPDCCH and an index of the SB at least one time at a reporting point of the corresponding BP within a specific cycle. This serves to forcibly provide minimum feedback for link adaptation of a control channel for the corresponding UE even when a channel of the SB including the EPDCCH SS is not superior to other SBs. For example, if the specific cycle equals a reporting cycle of every corresponding BP, this means that the corresponding BP reports only CSI of the SB including the EPDCCH.

Embodiment 3. RB/SB Selection Scheme for CSI Reporting

Figure 14:
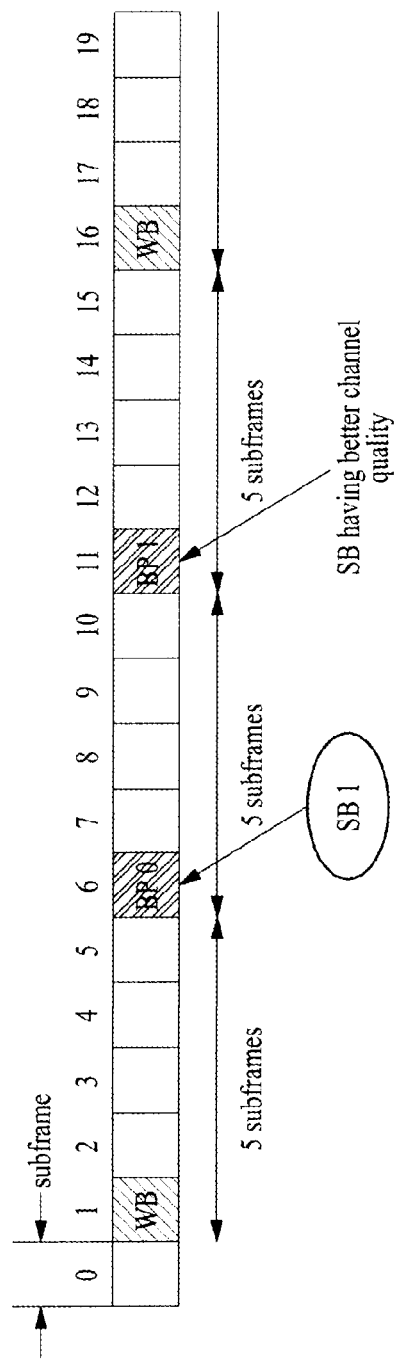
FIG. 14 illustrates exemplary channel state reporting according to another embodiment of the present invention.

FIG. 14 illustrates operation of feedback mode 2-0 when UE 1 is EPDCCH enabled as illustrated in FIG. 9. UE 1 reports CSI of SB1 which is always an EPDCCH SB at a reporting point of BP 0.

FIG. 14 illustrates an uplink subframe in which UE 1 always reports CSI of an EPDCCH SB at a reporting point of a BP including the EPDCCH SB. However, UE 1 should not always report CSI of an SB including EPDCCH SS in a BP including the EPDCCH SS. A cycle may be changed, or priority may be given to an EPDCCH to select an SB having the best channel quality. For example, in the case of FIG. 13, the SB including the EPDCCH SS is transmitted in a cycle of 15 ms. If this cycle is changed to 30 ms, only one of two feedback chances of BP 0 is used to transmit EPDCCH channel information.

Alternatively, although EPDCCH channel feedback is not forced, an offset Δ (Δ>0) may be given to a channel value of the SB including the EPDCCH and thus any another SB may not be selected if a channel value thereof is not sufficiently good to cancel out the offset Δ. The offset Δ may be an index on a CQI table or a decibel (dB) value in SINR. That is, if a value calculated using a CQI index for the channel quality of a PDSCH SB is not greater than that for the channel quality of the EPDCCH SB by n, or if an SINR thereof is not greater by n dB, a UE may report CSI of the EPDCCH SB. An eNB may adjust the offset Δ to change the number of times that the SB including the EPDCCH SS is selected. In addition, the proposed method is not limited to the above-described reporting schemes. In a reporting scheme by which one BP supports feedback of M channels, the UE may select M SBs by giving priority to the EPDCCH SB. Here, the operation for always including the SB including the EPDCCH in the selected M SBs may be understood that an extremely high priority is given to the SB including the EPDCCH.

Meanwhile, as another method for giving priority, instead of compensating a calculated (measured) actual CSI value and considering the compensated value to select an SB for CSI reporting, a CSI value of a specific RB/SB may be directly calculated to a high (or low) value. For example, a UE having received an RS to PDSCH power ratio calculates the CSI value by measuring RS Rx power and estimating PDSCH Rx power based on the received power ratio. In this case, priority may be given to a specific RB/SB by configuring the power ratio differently per RB/SB. That is, if PDSCH Tx power is configured to be greater than RS Tx power for a specific RB/SB, the specific RB/SB has a high priority compared to any other RB/SB. At this time, the value of the power ratio may be a value corresponding to actually allocated power or a value arbitrarily configured to give priority to the specific RB/SB.

The eNB may transmit an RS to PDSCH power ratio of each RB/SB to the UE through a higher layer signal, or transmit only a differential value from a single RS to PDSCH power ratio for each (or specific) RB/SB. Alternatively, the UE may assume a power ratio value to be applied to each RB/SB based on the received RS to PDSCH power ratio by applying the differential value or power ratio predetermined between eNB-UE for each (or a specific) RB/SB.

When a UE reports CSI, an SB to which priority is given is not always limited to an EPDCCH detection region assigned to the corresponding UE or to a region including EPDCCH detection regions of other UEs. The UE may calculate or report CSI by giving a high (or low) priority to a specific SB(s), and the specific SB(s) may be selected or suggested by an eNB. When priority is given, as described above, an SB having low priority should have better channel quality than other SBs by a certain level or above in terms of SINR or CQI to be determined as having an equivalent level of channel quality to the channel quality of the other SBs, and to be selected an SB for CSI reporting.

The method for giving priority to a specific RB/SB is useful when Inter Cell Interference Coordination (ICIC) is used. In a multi-cell wireless communication environment, eNB1 (i.e., aggressor cell) using high power may signal a set of RBs/SBs for which low Tx power is to be maintained by eNB1, to a neighbor cell (i.e., victim cell) through a backhaul link to avoid/reduce inter-cell interference. In this case, eNB1 may provide the information about the RBs/SBs for which low Tx power is to be maintained, through a higher layer signal such as an RRC signal to UEs served thereby. If fixed resources are used, no signaling may be needed or only an indicator indicating use of low Tx power may be signaled.

The UE having received the information about the RBs/SBs for which low Tx power is to be maintained may calculate and report CSI by giving a low priority to the corresponding RBs/SBs Like the above example, the RB/SB having a low priority should have better channel quality than other RBs/SBs by a certain level or above in terms of SINR or CQI to be determined as having an equivalent level of channel quality. In particular, an extremely low priority may be given to RBs/SBs for which zero power is predefined. This may be understood that the eNB instructs the UE to exclude the RBs/SBs for which low Tx power is to be maintained, from being selected for CSI reporting.

This method may also be used to report a WB CQI, and a detailed description thereof is not given here to avoid redundancy.

Using this method, a UE may be prevented from unnecessary feedback of RBs/SBs for which low Tx power or zero power is predefined and may be scheduled to avoid the corresponding RBs/SBs. Particularly, this may be useful if the eNB constantly maintains Tx power of CSI-RS even when low Tx power is predefined.

If neighbor eNB2 gets the information about the set of RBs/SBs for which low Tx power is to be maintained by eNB 1, eNB2 may signal locations of the corresponding RBs/SBs through a higher layer signal such as an RRC signal to specific UEs strongly interfered by eNB1. The specific UEs having received the corresponding higher layer signal may calculate and report CSI by giving a high priority to the RBs/SBs for which low Tx power is used by eNB1.

Even when the UE calculates a WB CQI, the UE may give a low priority to a specific RB/SB or exclude the specific RB/SB from CQI calculation. Giving a low priority means that the specific RB/SB is configured with a lower weight compared to other RBs/SBs when calculating the WB CQI, and giving an extremely low priority means that the specific RB/SB is excluded from calculating the WB CQI.

Upon determining low power transmission in a specific RB/SB, a channel state of the corresponding RB/SB may not be reflected to calculate WB CSI. This is because, if the number of low power RBs/SBs is large and deep fading is focused on the corresponding RBs, the UE will report a low WB CQI as long as no action is taken, but an actually achievable WB CQI using the other RBs can be higher.

A UE located at a cell edge and strongly interfered by a neighbor cell is not scheduled in an RB/SB in which the neighbor cell uses high Tx power. In this case, if the UE includes the corresponding RB/SB region to calculate a WB CQI, the CQI can be calculated to exceed a frequency region range in which the UE is actually scheduled, and a measurement result of the RB/SB having a very poor channel state is reflected to report a low CQI value compared to a WB CQI to be actually experienced by the UE. Accordingly, in this case, if eNB2 receives information about RBs/SBs for which high Tx power is maintained by eNB 1, through, for example, X2 signaling from eNB 1, eNB2 may signal the corresponding RBs/SBs through a higher layer signal such as an RRC signal to UEs served thereby and strongly interfered by eNB1. The UE having received the higher layer signal calculates and reports a WB CQI by excluding the corresponding RBs/SBs.

Unlike a legacy PDCCH having cell-specific characteristics, an EPDCCH may have UE-specific characteristics. This means that even two UEs connected to the same cell may have different frequency regions for EPDCCH detection. Although a PDSCH is transmitted to a specific UE, if a specific SB is configured as an EPDCCH region of a UE other than the corresponding UE and thus the EPDCCH of the other UE is transmitted with a very high possibility, the corresponding SB may not be easily allocated for the PDSCH of the specific UE. This is because the EPDCCH is not multiplexed with the PDSCH in the same RB. That is, in view of an eNB, if EPDCCH detection regions of a group of UEs are configured in a specific SB, the possibility of using the corresponding SB to transmit a PDSCH directed to a UE other than the corresponding UE is very low.

If this is used in terms of CSI reporting of a UE, the UE may receive a low priority in relation to CSI reporting of an SB in which EPDCCH detection regions of other UEs are focused. That is, although a specific SB has a good channel state, if the corresponding SB has a high possibility of being used to transmit EPDCCHs of other UEs, the UE selects another SB having a poor channel state but having a low possibility for transmission of EPDCCHs of other UEs and thus easily allocatable for a PDSCH of the UE, and uses the SB for CSI reporting. To this end, the eNB may signal an SB in which EPDCCH SSs of other UEs are focused, to each UE through a higher layer signal such as an RRC signal.

In another meaning, the eNB may previously designate a specific SB and instruct the UE to give a low priority of selection for CSI reporting to the corresponding SB. For example, an SB having a low priority should have better channel quality than other SBs by a certain level or above in terms of SINR or CQI to be determined as having an equivalent level of channel quality, and to be selected an SB for CSI reporting. If the eNB assigns an extremely low priority to a specific SB, this may be understood that the eNB instructs the UE to exclude the corresponding SB from being selected for CSI reporting.

Embodiment 4. RB/SB Selection Scheme for CSI Reporting

As a method for forcibly feeding back minimum EPDCCH CQI information, at least a specific number of EPDCCH SBs may be included in SBs selected by a UE for feedback as described below. The number of EPDCCH SBs to be specified may be determined using a predetermined value or through a higher layer signal.

The specified minimum number of EPDCCH SBs is assumed as k.

4-1. Aperiodic Scheme

The aperiodic scheme may use feedback mode 3-0 or 3-1, or feedback mode 2-0 or 2-1 in Table 4.

When PUSCH CQI/PMI feedback mode 3-0 or 3-1 is used, an SB configured by an eNB in this case corresponds to an EPDCCH SB.

As another method using PUSCH CQI/PMI feedback mode 3-0 or 3-1, if N>1, k (k<=N) EPDCCH SBs are included in N SBs configured by the eNB.

When PUSCH CQI/PMI feedback mode 2-0 or 2-1 is used, to feed back channel information of M SBs having the best channel quality measured by a UE, if M=1 and k=1, the UE configures the SB having the best channel quality as the EPDCCH SB. If M>1, the k (k<=M) EPDCCH SBs are included in the M SBs and the UE calculates and reports an average of CQI values of the M SBs. In this case, since indices of the M SBs having the best channel quality are also reported, indices of the k EPDCCH SBs may also be reported.

A specific example thereof is as described below. In the case of aperiodic reporting, the UE selects M preferred SBs and reports an average CQI value thereof. At this time, the M SBs may include a specific number of EPDCCH SBs, where the specific number is equal to or greater than 1. For example, the SBs are assumed to be sorted in descending order of CQI values as illustrated in FIG. 15(a). In this case, if the UE calculates CQI based on SBs having 4 upper CQI values, the SBs can include no EPDCCH SB as illustrated in FIG. 15(b). Even when arbitrarily selected 4 SBs are used instead of the SBs having 4 upper CQI values, the SBs may not be ensured to include an EPDCCH SB. Accordingly, if the M SBs selected by the UE definitely include one or more EPDCCH SBs, the UE selects 1 SB in a set of the EPDCCH SBs and selects 3 SBs among the other SBs. The case in which the UE selects 1 SB having the highest CQI value among the EPDCCH SBs and selects upper M−1 SBs among the other SBs is illustrated in FIG. 15(c). If three or more EPDCCH SBs are included, 3 SBs may be selected among the EPDCCH SBs and 1 SB may be selected among the other SBs as illustrated in FIG. 15(d).

Additionally, to reflect the channel state of the EPDCCH SB, a sufficient number of EPDCCH SBs may be preferably considered to calculate CQI. For example, if the UE is capable of selecting 4 SBs definitely including one EPDCCH SB, neither a channel value of the EPDCCH SB nor channel values of non-EPDCCH SBs may be appropriately reflected to calculate an average value thereof.

As another method, at least a specific number of times of EPDCCH SB reporting may be included within a feedback cycle. That is, EPDCCH SB reporting may be performed M (N>=M>1) or more times out of a total of N times of reporting. The number of times of EPDCCH SB reporting to be specified may be determined using a predetermined value or through a higher layer signal.

To ensure M or more times of channel information feedback using EPDCCH SBs out of N times of aperiodic reporting, the UE may determine whether to select SBs to be used for feedback among EPDCCH SBs or the other SBs according to a predetermined pattern upon a request of aperiodic reporting. Alternatively, after aperiodic reporting is performed N−M times, if EPDCCH SB feedback is performed less than M times, when aperiodic reporting is performed later, the UE may consecutively perform EPDCCH SB feedback a number of times to satisfy M.

4-2. Periodic Scheme

The periodic scheme may use feedback mode 2-0 or 2-1 of Table 5.

In PUCCH CQI/PMI feedback mode 2-0 or 2-1, reporting points have a specific cycle and CSI of BPs are sequentially reported. At a reporting point of each BP, an SB having the best channel quality in the corresponding BP is selected and channel information thereof is reported together with an SB index. If any BP has an SB including an RB used for an EPDCCH SS, a UE selects the SB including the EPDCCH and reports channel information and an index of the corresponding SB at least M times out of N reporting points of the corresponding BP. This serves to forcibly provide minimum feedback for link adaptation of a control channel for the corresponding UE even when a channel of the SB including the EPDCCH SS is not superior to other SBs.

Figure 16:
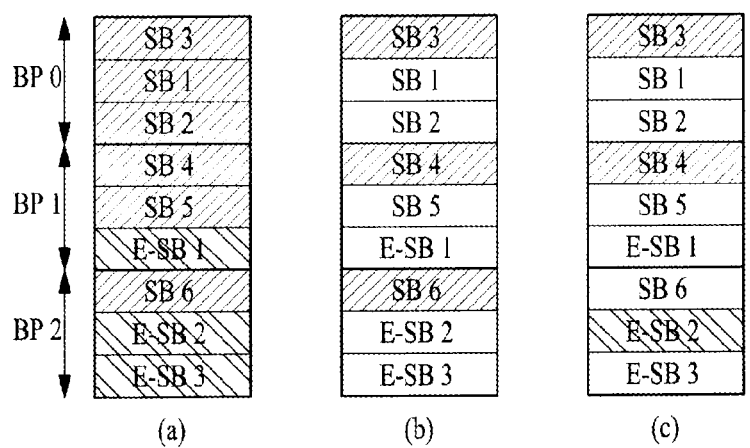
FIG. 16 illustrates exemplary subband selection according to another embodiment of the present invention.

A specific example thereof is as described below. In the case of periodic reporting, the UE selects one SB from each BP and sequentially reports CQI values thereof. When CQI values of 3 BPs are sequentially and periodically reported as illustrated in FIG. 16, if an SB having the best CQI is used for feedback, the UE may select an SB having the highest CQI value from each BP as illustrated in FIG. 16(b). However, if at least one time of EPDCCH SB feedback is definitely included within a first cycle (BP0→BP1→BP2) for reporting, EPDCCH SB feedback should be performed from one or more BPs as illustrated in FIG. 16(c). EPDCCH SB feedback may be performed sequentially from BPs using a fixed BP pattern or from a BP including an SB having the best CQI among EPDCCH SBs.

Figure 17:
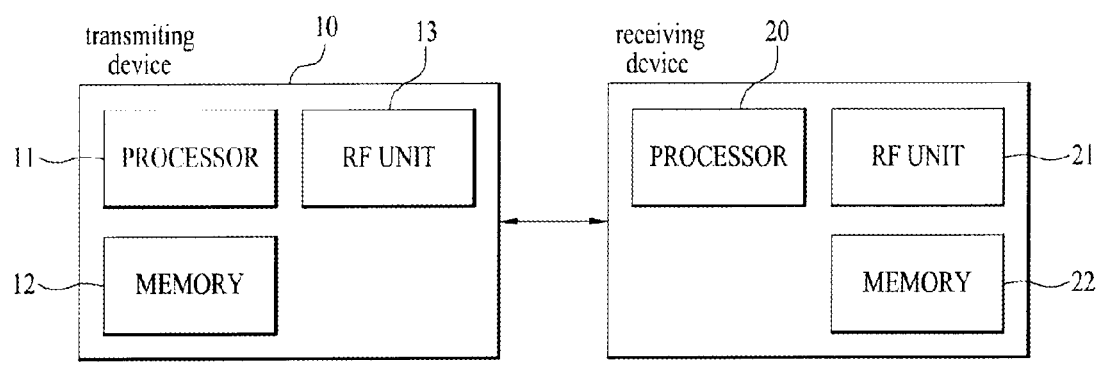
FIG. 17 is a block diagram of devices configured to implement embodiments of the present invention.

FIG. 17 is a block diagram of a transmitting device 10 and a receiving device 20 configured to implement exemplary embodiments of the present invention.

Referring to FIG. 23, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 in downlink. In embodiments of the present invention, an eNB serves as the receiving device 20 on uplink and as the transmission device 10 in downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention is applicable to a wireless communication device such as a user equipment (UE), base station (BS), or other devices.

The invention claimed is:

1. A method for reporting channel state of an Enhanced Physical Downlink Control Channel (EPDCCH) in a wireless communication system, the method comprising:
    selecting N subbands among a set of subbands; and
    calculating and reporting a Channel Quality Indicator (CQI) for the selected N subbands,
    wherein the selected N subbands includes M EPDCCH subbands (EPDCCH SBs), where N and M are integers equal to or greater than 1 and N is equal to or greater than M, and the M EPDCCH SBs are upper M EPDCCH SBs ranked in a descending order of CQI value among EPDCCH SBs included in the set of subbands, and
    wherein each of the EPDCCH SBs includes a Physical Resource Block (PRB) pair to which the EPDCCH is mapped.

2. The method according to claim 1, wherein N and M are configured through a higher layer signal.

3. A user device that reports channel state of an Enhanced Physical Downlink Control Channel (EPDCCH) in a wireless communication system, the user device comprising:
    a Radio Frequency (RF) unit; and
    a processor that controls the RF unit,
    wherein the processor:
    selects N subbands among a set of subbands, and
    calculates and reports a Channel Quality Indicator (CQI) for the selected N subbands, and
    wherein the selected N subbands includes M EPDCCH subbands (EPDCCH SBs), where N and M are integers equal to or greater than 1 and N is equal to or greater than M, and the M EPDCCH SBs are upper M EPDCCH SBs ranked in a descending order of CQI value among EPDCCH SBs included in the set of subbands, wherein each of the EPDCCH SBs includes a Physical Resource Block (PRB) pair to which the EPDCCH is mapped.

4. The user device according to claim 3, wherein N and M are configured through a higher layer signal.

5. A method for reporting channel state of an Enhanced Physical Downlink Control Channel (EPDCCH) in a wireless communication system, the method comprising:

adding a predetermined offset value to a CQI value of at least one EPDCCH subband (EPDCCH SB), the EPDCCH SB including a Physical Resource Block (PRB) pair to which the EPDCCH is mapped;

selecting the N subbands among a set of subbands including the at least one EPDCCH SB based on a CQI value of the subbands; and reporting a Channel Quality Indicator (CQI) for the selected N subbands, wherein the CQI value is determined as a ratio of a reference signal power to Physical Downlink Shared Channel (PDSCH) power.

6. A user device configured to transmit that transmits an uplink signal in a wireless communication system, the user device comprising:

a Radio Frequency (RF) unit; and a processor that controls the RF unit, wherein the processor:

adds a predetermined offset value to a CQI value of at least one EPDCCH subband (EPDCCH SB), the EPDCCH SB including a Physical Resource Block (PRB) pair to which the EPDCCH is mapped;

selects the N subbands among a set of subbands including the at least one EPDCCH SB based on a CQI value of the subbands, and reports a Channel Quality Indicator (CQI) for the selected N subbands, wherein the CQI value is determined as a ratio of a reference signal power to Physical Downlink Shared Channel (PDSCH) power.

\* \* \* \* \*